UNITED STATES PATENT OFFICE.

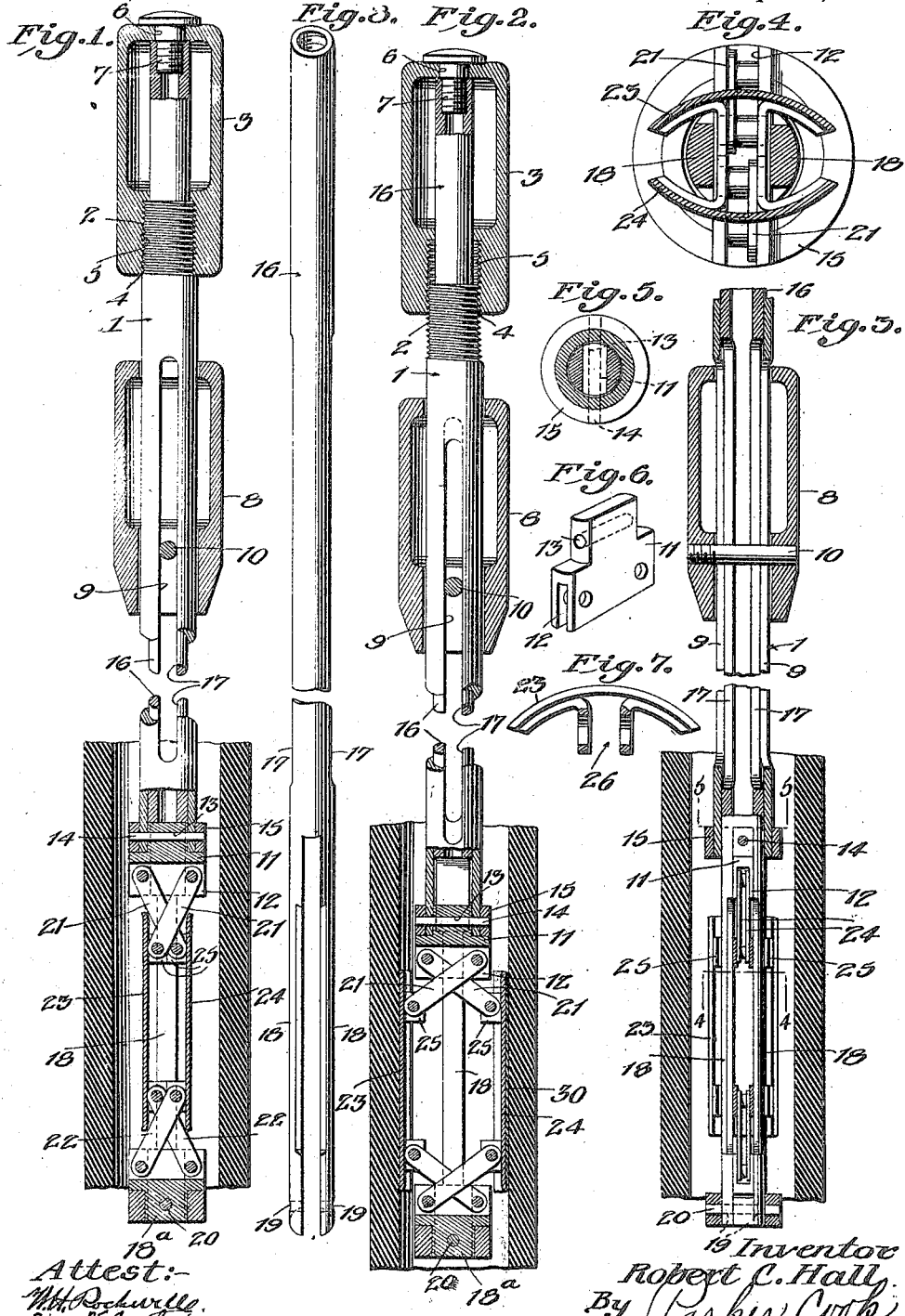

ROBERT C. HALL, OF LEXINGTON, KENTUCKY; N. CARRIE HALL ADMINISTRATRIX OF SAID ROBERT C. HALL, DECEASED.

METHOD OF PATCHING HOSE AND TOOL THEREFOR.

1,180,714.

Specification of Letters Patent.  Patented Apr. 25, 1916.

Application filed March 11, 1915.  Serial No. 13,766.

*To all whom it may concern:*

Be it known that I, ROBERT C. HALL, a citizen of the United States, and a resident of Lexington, county of Fayette, and State of Kentucky, have made and invented certain new and useful Improvements in Methods of Patching Hose and Tools Therefor, of which the following is a specification.

My invention relates to a new and useful improvement in hose patching tools, readily adaptable for use with either a cloth or rubber hose and especially designed for use in patching or vulcanizing steam, or water hose used in connection with freight or passenger cars.

It will be understood that the air or steam hose in use on railroad cars generally have a casting at their one end that is oftentimes difficult to remove, the casting usually having an opening therein which is smaller than the internal diameter of the hose to which it is fastened.

An object of my invention therefore is to provide a tool having at its lower end an expansible member, the diameter of which when collapsed is smaller than that of the opening of the castings usually connected or attached to the hose, the said member however being capable of expanding to a diameter as great or greater than the internal diameter of the hose in which the tool is to be inserted.

Another object of my invention is to provide a tool wherein the end member may be expanded for the purpose of placing a patch on the inner surface of the hose, and also capable of being contracted after the patch is set in place.

Still another object of my invention is to produce a tool of the character described wherein the parts may be quickly and readily assembled, cheap to manufacture, and neat in appearance.

With these and other objects in view my invention consists in certain new and novel constructions and combinations of parts as will hereinafter be more fully described and pointed out in the claims.

In the drawings Figure 1 is a longitudinal sectional view of the tool with the end member in its contracted or normal position. Fig. 2 is a similar view but with the end member in its expanded position. Fig. 3 is also a longitudinal sectional view but taken at right angles to Fig. 1. Fig. 4 is a sectional view taken on line 4—4 of Fig. 3. Fig. 5 is a sectional view taken on line 5—5 of Fig. 3. Fig. 6 is a detail perspective view of the upper connecting means. Fig. 7 is a view of one of the shoes or plates of the expanding member. Fig. 8 is the inner member for operating the expandible member carrying the shoe 7.

Referring now to Fig. 1 it will be seen that there is provided an outer casing or member 1 externally threaded at its upper end 2 and on which is removably threaded a handle 3, this handle being provided with the opening 4 and the internal threads just mentioned 5, and is provided also at its upper end with an opening 6 through which passes an externally threaded pin 7, the pin extending for a short distance into the said handle 3. A second handle 8 is provided for alining means which simply slides up and down on the outer casing or member 1.

Provided in the outer member 1 is a slot 9, and provided in the handle 8 is an opening for the reception of a pin 10, which also passes through a slot in an inner member to be afterward referred to.

Secured at the lower end of the member 1 is a "connecting member" 11 which is shown in detail in Fig. 6, the upper portion being reduced and the lower portion thereof being bifurcated to form a channel portion longitudinally thereof as shown at 12. The upper portion of this connecting member 11 is provided with a hole or passageway 13 for the reception of a pin 14 which also passes through at the opposite side of a surrounding or circular collar 15.

Referring now to Fig. 8 there is shown an inner casing or member 16 the external diameter of which is less than the internal diameter of the member 1 and is adapted to fit within the same and be movable therein. It will also be noticed that this inner member 16 must be longer than the outer casing and is also provided midway thereof with a slot 17 extending longitudinally thereof, said slot 17 being in alinement with the slot in the outer casing and through which passes the pin 10 already mentioned. The lower end of this inner member 16 is bifurcated to form the two arms 18 and between these arms 18 and at the upper end thereof is placed the connecting member 11. At the lower end of these arms is another connecting member 18ª similar in all respects to the connecting member 11 the only distinction however being that the hole or passageway in the upper reduced portion extends transversely thereof instead of longitudinally. The arms 18 are provided with a hole 19 for the reception of a pin 20 which passes through the said arms and through the lower connecting member 18ª to securely hold the same to the inner member 17.

Thus far it will be seen that we have an outer member to which is secured a connecting member 11, and also an inner member and at the lower end of which is also secured a similar connecting member, and the inner and outer member capable of movement with relation to each other.

Referring now to Figs. 1 and 2 it will be seen that pivotally connected to the "connecting member" 11 are the links 21 which links are shown as cruciform, and similarly, to the lower "connecting member" 18ª are similar links 22. The other ends of these links 21 are connected to two shoes or plates 23 and 24 which are provided with lugs or fastening means 25 as shown in sectional view Fig. 7 which fastening means are provided with the slots 26, these shoes or plates extending for the greater distance around the inner portion of a hose when inserted.

It will thus be seen that within the outer casing or member 1 is the inner casing or member 16 and threaded on the upper end of the outer casing 1 is the handle 3 and up into which extends the upper end of the inner member 16 and freely through the upper portion of the handle extends the threaded pin which also engages correctly inner casing 16. The sliding handle 8 for alining purposes fits around the outer member 1 and the pin 10 passes through the slot in both the inner and outer members and prevents any relative rotation of the two members.

Secured to the outer member is the connecting member 11 to which in turn are fastened the pivotal links 21 which in their turn are connected to the shoes or plates 23 and 24, and to the other ends of the shoes or plates are the pivotal links which are connected to the connecting member 18ª which is fastened by the pin 20 to the two arms of the inner member casing 17, the upper connecting member fitting within the two arms 18.

The operation of the device is therefore as follows: Starting with the plates or shoes in their normal or closed position they are inserted in a hose to be patched, and laid on one of the shoes 23 or 24 is a piece of rubber or cloth 30, it depending of course on the nature of the article to be patched, the patch being coated with cement or other adhesive means. After the plates have been inserted the handle 3 is rotated in a left hand direction or in a direction that would tend to remove the handle which movement by means of the threaded pin at the end draws the inner member outwardly, which of course pulls the lower connecting member 19 upwardly or toward the upper connecting member 11 which is held stationary by the outer member and as the member 18ª is drawn toward the member 11 the pivotal links will operate to throw or force the shoes or plates 23 in their outward position, as clearly shown in Fig. 2. The tool is then allowed to remain in this position until the patch has adhered to the casing and afterward the handle is turned in a right hand manner which in turn forces the inner member downwardly through the outer member and forces the connecting member 18ª away from the connecting member 11, and through the action of the pivotal links already mentioned draws the plate or shoes inwardly, when the tool may then be removed.

The handle 8 is used for alinement purposes and to securely grip the tool and the pin passing through the slots in both the inner and outer members prevent the inner member from turning which would change the position of the shoes or plates within the casing.

With the use of the above tool it will be seen that the same may be inserted through a hole, the internal diameter of which is much less than that of the hose to be patched; that a patch may be applied to the inner or internal diameter of the hose, and at the same time sufficient pressure may be exerted thereon to assist in the adhesion and the tool may then be operated to again compress the plates so that the tool may be withdrawn. After the inner patch has been inserted, the outer surface of the hose may be filled in to the desired thickness with layers of rubber or cloth or cloth and cement, it depending on the nature of the article to be finished.

It will be understood that the tool may be as long as desired and that many minor changes may be made without affecting or without in any way interfering with the scope of the invention.

From the foregoing it will be seen that the tool is a comparatively simple one, consisting of essentially an inner and an outer member, an upper handle and an alining handle, connecting members and two shoes or plates pivotally connected thereto, also having the members collapsible to an extent wherein their diameter is less than that of the openings in castings generally used on train hose or steam hose. Therefore when a hose has been brought into a shop for repair it will only be necessary to place a raw rubber patch on the shoe, insert the collapsible members, expand the same for the required amount of time, and then patch the hose from the outer side filling up to the requisite amount.

Having thus clearly described my invention what I claim as new and desire to secure by Letters Patent is:

1. The method of patching, or repairing hose which consists of applying an internal patch, applying internal mechanical pressure through an opening in one end thereof and then relieving the internal mechanical pressure and building up externally to the desired thickness.

2. In a repair tool two primary members, two oppositely arranged concave plates connected thereto and capable of moving transversely to the axis of said members when one of said members is moved with relation to the other.

3. In a repair tool an inner and outer member, means for providing against relative rotation of said inner and outer members, oppositely arranged concave plates connected to said members and capable of moving transversely to the axis of said members when one of said members is moved with relation to the other.

4. In a repair tool an inner and outer member and oppositely arranged plates connected thereto, means secured to said members to move one with respect to the other to thereby cause said plates to move transversely with respect to the axis of said members and remain parallel to each other throughout their movement.

5. In a repair tool an inner and outer member and plates connected thereto, a handle secured to said members, said handle capable of longitudinal movement with respect to the one member and locked against said movement with respect to the other to thereby move said plates toward and away from each other and said plates so arranged as to remain parallel to each other throughout their movement.

6. In a repair tool an inner and outer member, plates secured thereto, a handle threaded on said outer member and a pin passing freely through said handle and locked to said inner member to thereby move the inner member when the handle is turned to force said plates toward and away from each other.

7. In a repair tool an inner and outer member, oppositely arranged concave plates pivotally connected to said members and means connected to said inner and outer members to move the inner member with respect to the outer and thereby force the plates toward and away from each other.

8. In a repair tool an inner and outer member, plates linked to said members said links being so arranged that said plates remain parallel to each other when forced together and apart.

9. In a repair tool an inner and outer member, upper connecting means secured to the lower end of said outer member, said inner member provided at its lower end with a lower connecting means, said upper connecting means fitting within said inner member, plates linked to said upper and lower connecting means and to be thereby forced together and apart when the lower connecting means is moved with relation to the upper connecting means.

10. In a repair tool, two plates an upper and lower connecting means, cruciform links connecting both plates to the said connecting means, and outer and inner members connected respectively to the said upper and lower connecting means, means for preventing the relative rotation of the inner and outer members, and means for moving the inner member with respect to the outer member.

11. A repair tool comprising in part an inner member provided with a longitudinally extended slot approximately midway between its ends, the lower portion being bifurcated for the reception of upper and lower connecting means.

12. A repair tool comprising in part an inner member provided with a longitudinally extending slot approximately between its end, the lower portion of said member being bifurcated to form two parallel arms, upper connecting means fitting between said arms at their upper ends, lower connecting means secured to the lower ends of said arms, and said arms being reduced between their upper and lower ends.

13. In a repair tool an inner and outer member provided with slots, said inner member being bifurcated at its lower end to form two arms, lower and upper connecting means respectively secured to said outer and inner members and fitting within said bifurcated arms, plates linked to said connecting means adapted to be forced toward and away from each other by the movement of said inner member, means for moving said inner member with respect to the outer member and a second handle slidable on said outer member and provided with a pin extending within the slots in the inner and outer members to prevent the relative rotation of said members.

Signed at Lexington and State of Kentucky this 8th day of March, A. D. 1915.

ROBERT C. HALL.

Witnesses:
J. W. THROCKMORTON,
G. Y. REYNOLDS.